Figure 1:
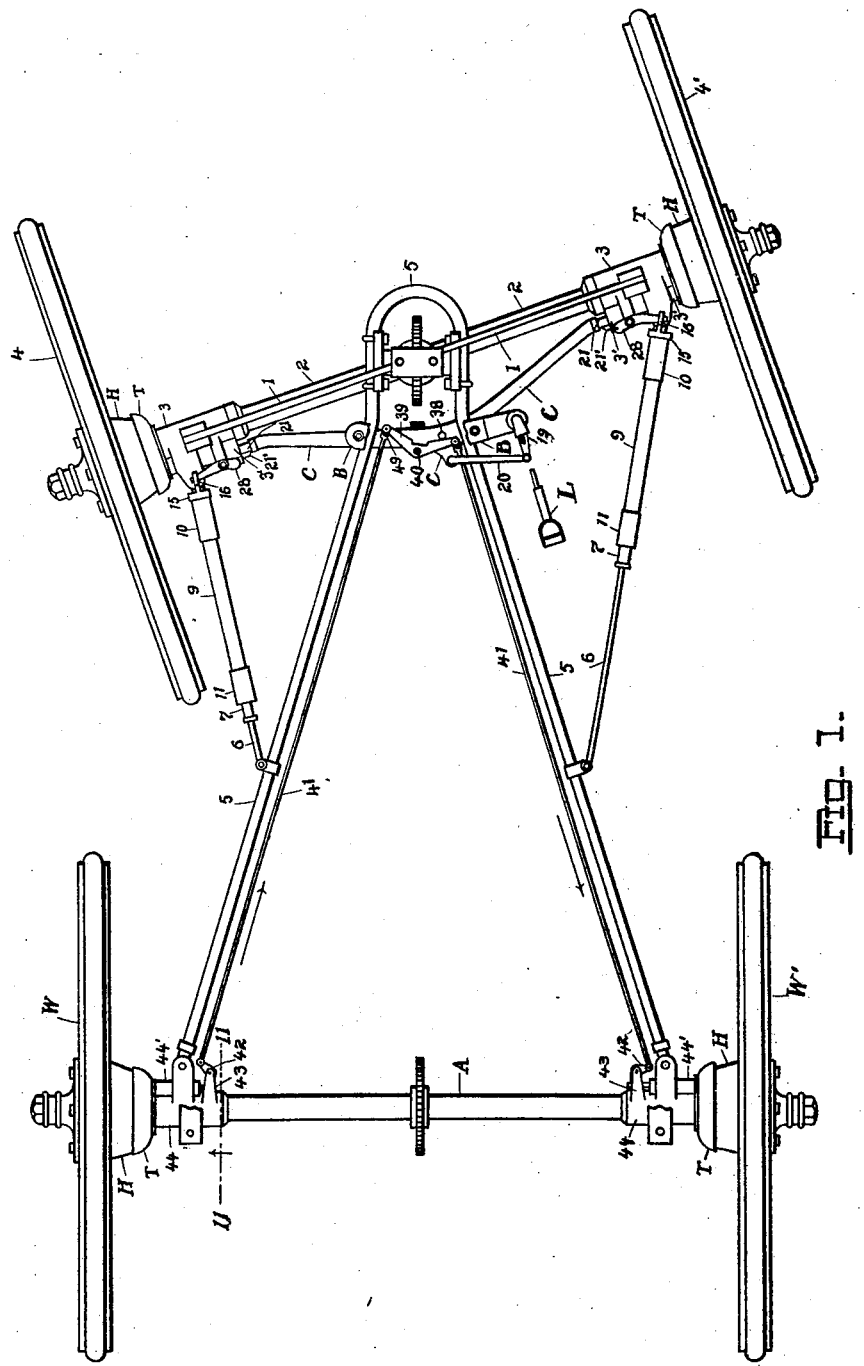

No. 696,210. Patented Mar. 25, 1902.
P. STEINHAUER.
AUTOMOBILE DRIVING GEAR.
(Application filed Jan. 13, 1902.)
(No Model.) 4 Sheets—Sheet 1.

Witnesses
Inventor
Peter Steinhauer
By his Attorney
Emil Starek

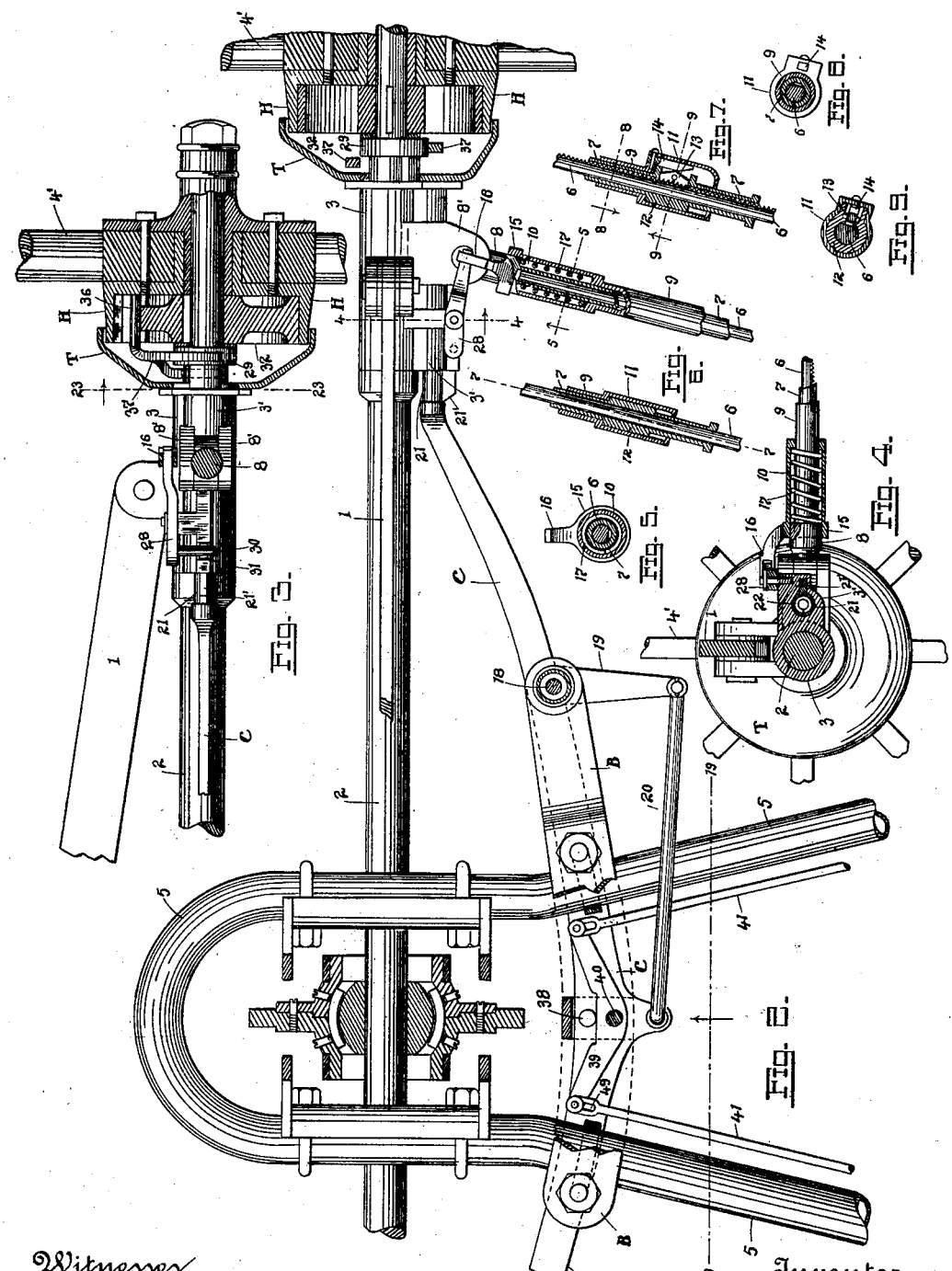

No. 696,210. Patented Mar. 25, 1902.
P. STEINHAUER.
AUTOMOBILE DRIVING GEAR.
(Application filed Jan. 13, 1902.)
(No Model.) 4 Sheets—Sheet 3.
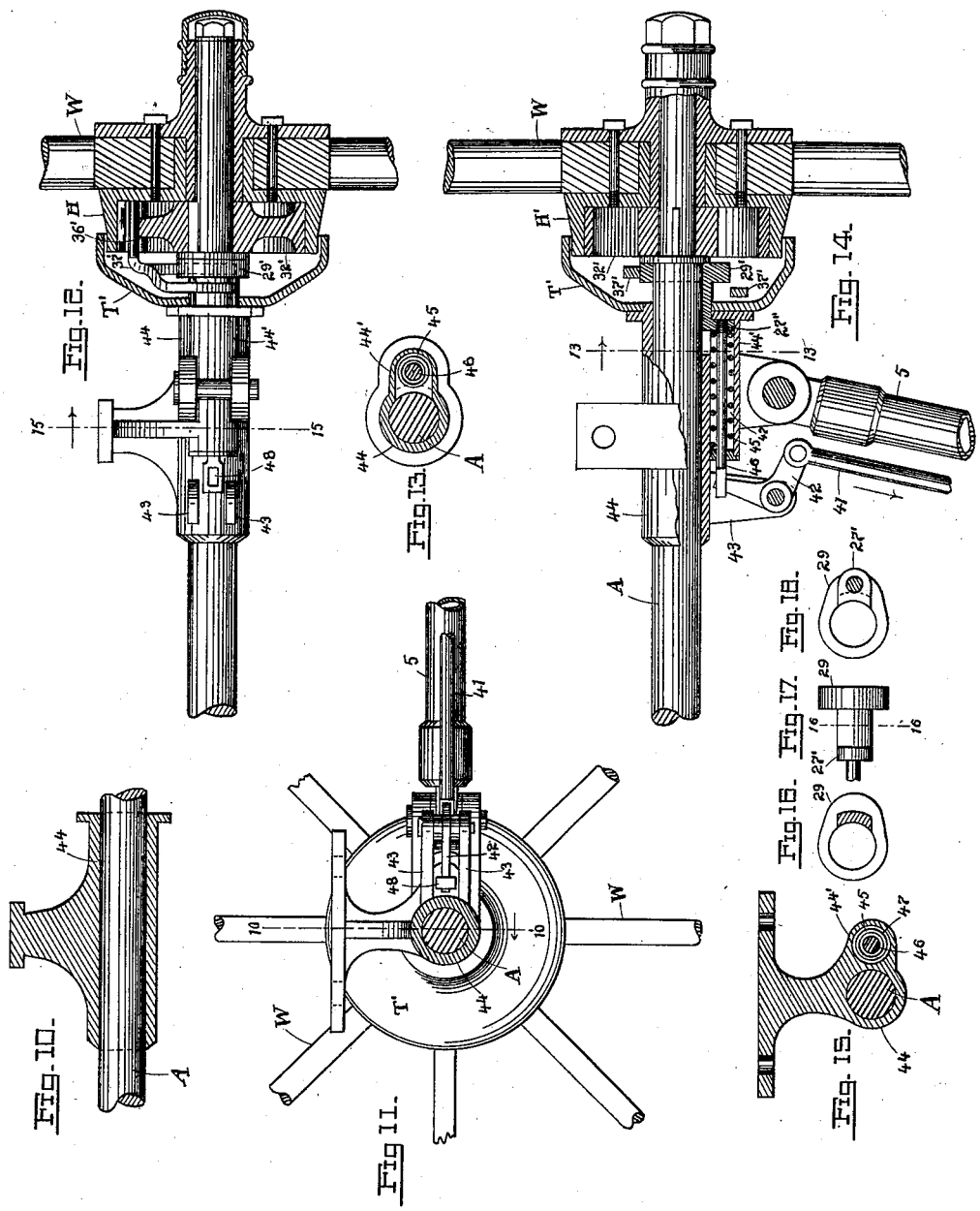
Witnesses
Inventor
Peter Steinhauer
By his Attorney
Emil Starek No. 696,210. Patented Mar. 25, 1902.
P. STEINHAUER.
AUTOMOBILE DRIVING GEAR.
(Application filed Jan. 13, 1902.)
(No Model.) 4 Sheets—Sheet 4.
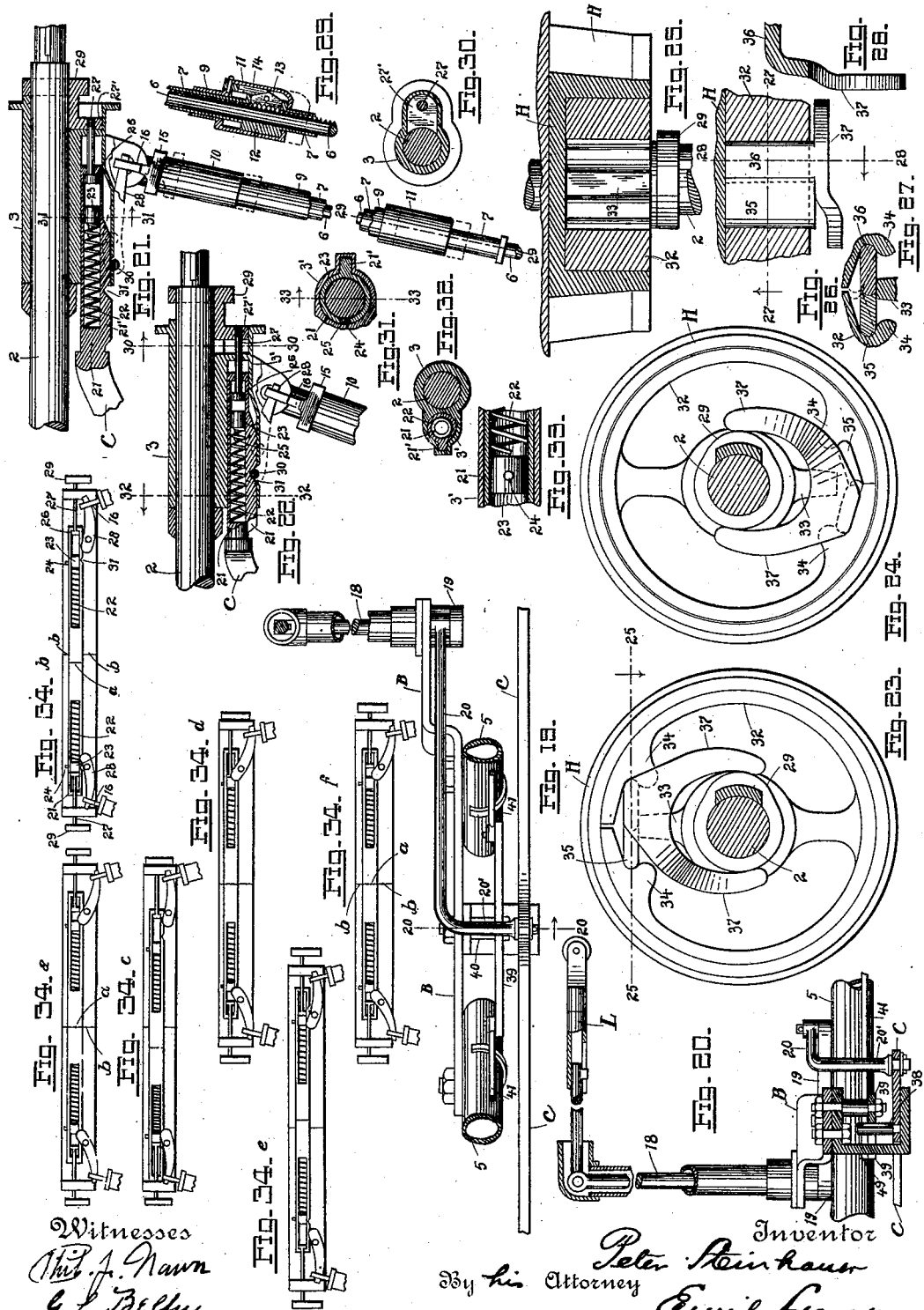
Witnesses
Inventor
Peter Steinhauer
By his Attorney

UNITED STATES PATENT OFFICE.

PETER STEINHAUER, OF ST. LOUIS, MISSOURI.

AUTOMOBILE DRIVING-GEAR.

SPECIFICATION forming part of Letters Patent No. 696,210, dated March 25, 1902.

Application filed January 13, 1902. Serial No. 89,574. (No model.)

*To all whom it may concern:*

Be it known that I, PETER STEINHAUER, a citizen of the United States, residing at St. Louis, State of Missouri, have invented certain new and useful Improvements in Automobile Driving-Gear, of which the following is a full, clear, and exact description, reference being had to the accompanying drawings, forming a part hereof.

My invention has relation to improvements in automobile driving-gear; and it consists in the novel construction and arrangement of parts more fully set forth in the specification and pointed out in the claims.

In the drawings, Figure 1 is a top plan of a wagon-frame with the axle of the front truck deflected to make a turn to the left, showing my invention applied thereto. Fig. 2 is a combined section and plan of the front end of the frame, showing the front axle in its normal position and showing the hub of the wheel thereof clutched to said axle. Fig. 3 is a combined vertical section and elevation of the right-hand end of Fig. 2. Fig. 4 is a transverse section taken on line 4 4 of Fig. 2. Fig. 5 is a cross-section on line 5 5 of Fig. 2. Fig. 6 is a section taken through the extension member by which the front axle is held rigidly to the coupling-pole, said section being a longitudinal one at right angles to the view shown in Fig. 7. Fig. 7 is a longitudinal section on line 7 7 of Fig. 6. Fig. 8 is a transverse section on line 8 8 of Fig. 7. Fig. 9 is a transverse section on line 9 9 of Fig. 7, taken through the coupling-block of said extension member. Fig. 10 is a transverse vertical section on line 10 10 of Fig. 11. Fig. 11 is an elevation of the wheel of the rear truck and a cross-section taken through the axle thereof on line 11 11 of Fig. 1. Fig. 12 is a combined vertical longitudinal section and elevation of the rear axle and clutch mechanism thereof. Fig. 13 is a transverse section on line 13 13 of Fig. 14. Fig. 14 is a longitudinal section at right angles to Fig. 12. Fig. 15 is a transverse section on line 15 15 of Fig. 12. Fig. 16 is a transverse section on line 16 16 of Fig. 17. Fig. 17 is an elevation of the shifting clutch-cam of the rear axle. Fig. 18 is an end view thereof looking toward Fig. 17 from the left. Fig. 19 is a vertical section taken transversely to the coupling-pole on line 19 19 of Fig. 2, showing a rear elevation of the rocking yoke and bars coupled thereto. Fig. 20 is a vertical section taken at right angles to Fig. 19 on line 20 20 of said figure. Fig. 21 is a horizontal section of the clutch-controlling mechanism shown in elevation in Fig. 2, the same being shifted to a position sufficient to release the coupling-block carried by the extension member, which latter is shown in elevation. Fig. 22 is a similar view showing the parts in their normal position. Fig. 23 is a face view of the clutch-fork, clutch-disk, and clutch-cam, being a section on line 23 23 of Fig. 3, the dust or cover plate being removed for purposes of this section and the clutch-disk being in frictional engagement with the hub of the wheel. Fig. 24 is a similar view, but with the clutch-fork removed one hundred and eighty degrees and the cam shifted to engage that member of the fork adjacent to the toggle-link, whereby the clutch-disk is frictionally disengaged from the hub of the wheel, the disk being shown in such disengaged position. Fig. 25 is a horizontal section on line 25 25 of Fig. 23 with fork and toggle-link omitted. Fig. 26 is a detail in top plan showing the manner of coupling the toggle-link to the clutch-fork and mounting the parts on the clutch-disk. Fig. 27 is a transverse vertical section on line 27 27 of Fig. 26. Fig. 28 is a longitudinal section through the toggle-joint on line 28 28 of Fig. 26. Fig. 29 is a sectional detail similar to Fig. 7, showing the coupling-block of the extension member disengaged, the section being on line 29 29 of Fig. 21. Fig. 30 is a cross-sectional detail on line 30 30 of Fig. 22. Fig. 31 is a cross-sectional detail on line 31 31 of Fig. 21. Fig. 32 is a cross-sectional detail on line 32 32 of Fig. 22. Fig. 33 is a section at right angles to Fig. 31, being on line 33 33 of said figure; and Figs. 34$^a$, 34$^b$, 34$^c$, 34$^d$, 34$^e$, and 34$^f$ are diagrammatic views showing the various positions to which the clutch-controlling bar is shifted to effect a single release of the clutch and its subsequent reëngagement with the hub of the wheel.

The present invention is an improvement on the driving-gear shown and described in United States Patent No. 672,718, granted me on April 23, 1901, and while contemplating the several objects therein set forth the present device effects a simultaneous engagement or disengagement of the adjacent front and rear wheels, according to the direction in which the vehicle is to travel. Like in the patent referred to the driven axle or that to which the power is directly applied (the front one) is capable of horizontal deflection, according to the curve which the vehicle is to describe when not traveling in a right line. The present invention, too, contemplates a rigid connection between the front oscillating or deflectable axle and the coupling-pole connecting the front and rear trucks. It also presents further and other advantages better apparent from a detailed description of the invention, which is as follows:

Referring to the drawings, 1 represents the front truck; 2, the front axle; 3, the bearings therefor, and 4 4' the wheels, freely rotatable about the ends of the axle. The axle is mounted in a manner identical with that in my patent above referred to, being capable of oscillation in a horizontal plane to facilitate the travel of the vehicle in a curve, so that these features of the construction, though herein shown, are not referred to.

Whether the vehicle is traveling in a right line or in a curve and whatever be the amount of deflection imparted to the axle 2 it is desirable that a rigid connection be always maintained between said axle and the coupling-pole 5 of the carriage-frame. Before describing the construction of the parts which are brought into service for a deflected position of the front axle I shall first describe the mechanism which insures the rigid connection just referred to.

Pivotally clamped at a convenient point to each member of the coupling-pole is the rear projecting end of a toothed extension-bar 6, loosely and telescopically operating in a tube 7, whose forward end is secured to a stud 8, pivotally mounted between lugs 8' 8' of the bearing 3. The tube 7 is surrounded by an outer sleeve 9, having a forward enlarged chamber 10 and a rearward enlarged chamber 11. Within the latter chamber the tube 7 is enlarged into a collar 12, within which is formed a pocket for the reception of a toothed coupling-block 13, said block normally blocking the extension-bar against longitudinal movement, the block being held in its locked or engaging position by a wedge 14, mounted in the chamber 11. The forward end of the chamber 10 terminates in a ring 15, free to slide over the stud 8 and provided with a loop 16, by which the ring 15 may be seized and the sleeve 9 be actuated. Interposed between the end of the stud 8 and the base of the chamber 10 and encircling the tube 7 is a coiled spring 17, whose normal tendency is to force the sleeve 9 rearwardly and bring the wedge 14 under the block 13 and hold the latter in engagement with the extension-bar 6. Should the sleeve 9 be drawn forward a distance sufficient to withdraw the wedge 14 from under the block 13, Fig. 29, the latter will drop to its lowest position within the chamber 11, and thus leave the bar 6 to be withdrawn to any extent to conform to any particular deflection of the front axle. The latter when once deflected to its proper angle may be again rigidly connected to the coupling-pole by permitting the spring 17 to return the parts to their normal position, Fig. 7, when a rigid connection will again be effected, it being understood that such return of the parts allows the wedge 14 to force the block 13 back into engagement with the bar 6. The movement of the sleeve 9 when drawn sufficiently forward to effect the release of the block 13 is arrested by the base of the shoulder formed by the adjacent end of the collar 12, Figs. 7, 29. The bar 6, tube 7, and sleeve 9 are collectively denominated as the "extension member," whose operation while here described in the abstract will presently be associated with the movements of the clutch mechanism for a better understanding thereof. In point of time the extension members are operated both before any actual deflection of the front axle takes place and after the same has been deflected, the clutch mechanism being in the meantime actuated. The clutch mechanism is the one which determines whether the wheels shall remain coupled to the axle or be disengaged therefrom, and while such clutch mechanism is substantially the same at each end of the vehicle there is enough difference between them that it will be in order to describe the forward mechanism first.

Referring more particularly to Figs. 1, 2, 3, 19, 21, 22, 23, and 24, C represents a clutch-controlling bar movable in a direction parallel to the front axle, such movement being effected by means of a lever or handle-bar L, Fig. 1, adapted to be coupled to a rotatable staff 18, mounted on a bracket B, bolted to the coupling-pole 5, the base of the staff carrying an arm 19, pivotally connected to a curved link 20, whose downwardly-deflected extension 20', Fig. 19, is pivoted to the center of the bar C. In swinging the handle-bar L in one direction or the other the bar C can be moved correspondingly. The opposite ends of the bar C are each provided with a socket 21, at the base of which is confined a coiled spring 22, whose outer end carries a head or block 23, guided and limited in its movements within the socket by a peripherally-projecting pin 24, operating in an elongated slot 25, formed in the adjacent wall of the socket. When the parts are in their normal or central position, Fig. 2, and the wagon travels a right line, the piston 26, with which the socket 21 is provided, occupies a position approximately midway the block 23 and the outer end wall of the socket, Fig. 22, said piston being coupled to a piston-rod 27, whose outer end is connected to a lug or ear 27', cast with the hub portion of a clutch-cam 29, the parts 21, 22, 23, 26, and 27 all being carried within the lateral extension 3' of the formation constituting the bearing 3 for the wheel and the socket 21, having formed therewith a tongue 21' to better guide it within said lateral extension. Pivoted above the extension 3' is a tripping-lever 28, whose long arm engages the loop 16, the under side of the short arm being provided with a pin 30, normally resting at the base of a V-shaped notch 31, formed in the tongue 21', this arrangement causing the free end of the long arm to tilt forward and outward the moment the tongue 21' is moved sufficiently in either direction to cause the pin 30 to be withdrawn from the notch 31, for it is obvious that the pin following the inclined wall of the notch will tilt the lever 28, as indicated, such tilting drawing on the loop 16 and causing a disengagement of the extension-bar 6 from the coupling-block 13. It is also obvious that the moment the tongue 21' is restored to bring the pin 30 opposite the notch 31 thereof the pin will snap back into reëngagement under the action of the spring 17, housed at the forward chamber of the extension member. Thus in Fig. 22 the parts are shown normal. In Fig. 21 the tongue 21' has been withdrawn, (the bar C having been shifted to the left,) tripping the lever 28 to cause the latter to pull on the sleeve 9 a distance indicated by the difference in position between the solid and dotted parts in Fig. 21 and disengage the block 13 from the extension-bar 6, Fig. 29. As the bar C is thus shifted from its central position (and assuming that it has been shifted to the left for convenient reference to Figs. 21, 22) the piston 26 finally encounters the end wall of the socket 21 and draws the piston-rod 27 and cam 29 with it to its disengaged position, as seen in Fig. 21. What constitutes the "disengaged" position for the cam 29 as compared with its "engaged" position will now be explained.

The engaged position of the cam which freely slides along the axle is that position which insures the clutching of the wheel to the axle and makes the former rotatable with the latter. The mechanism by which the wheel is thus retained coupled or clutched to the axle is as follows: Mounted within the hub of the wheel 4 4' is a split clutch-disk 32, keyed to and rotatable with the axle, the split end of the disk being immediately in line with the radial rib or ridge 33, projecting from the hub portion thereof. Formed along the inner surface of the clutch-disk at points opposite the edge of the ridge 33 are shoulders 34 for the pivotal support of respectively the toggle-link 35 and the hinge-arm 36 of the clutch-fork 37. As previously stated, the clutch-disk 32 rotates with the axle 2, carrying the clutch-fork with it. An inspection of Figs. 2, 3, 26 will show that the members of the fork are not disposed in the same plane, so that as the fork is carried around with the axle the engaged or disengaged position of the cam 29 will depend on which member of the fork encounters said cam during the revolution of the fork. If the cam is allowed to remain in a normal position, Figs. 2, 3, 22, so that it will encounter in the rotation of the fork the member opposite the toggle-link, the fork as a whole will be tripped by said cam, so as to straighten out the toggle-link and hinge-arm 36, thus forcing the walls of the clutch-disk apart firmly against the inner walls of the hub H of the wheel 4' and cause the latter to rotate with the axle. If, on the other hand and during the rotation of the clutch-disk, the cam is shifted, Fig. 21, to bring the same in the plane of rotation of that member of the fork which is adjacent the toggle-link 35, then the fork will be tripped so as to throw the link outwardly, causing the walls of the clutch-disk to spring together and release their frictional hold on the walls of the hub, Fig. 24, whereupon the wheel will become loose on the axle, and the latter will rotate independently of said wheel. To prevent the toggle-link 35 and hinge-arm 36 from passing the dead-center or the point at which they are in the same straight line, any further movement beyond such point is intercepted by the radial ridge 33 of the hub of the clutch-disk, Fig. 23.

A reference to Figs. 2 and 3 will disclose the fact that the cam 29 is limited in its movement along the axle in one direction by the clutch-disk, with which it comes in contact when in its engaged position, so that if (referring again to said figures) the bar C is moved to the right in order to disengage the clutch from the left-hand wheel, as in Fig. 1, some provision must be made in the general construction of said bar to permit of this movement. This provision exists in the springs 22 and block 23 previously referred to. In the movement of the bar C to the right, as just referred to, the block 23, Fig. 22, would first come in contact with the piston 26 of the wheel. Upon a further movement of the bar the spring 22 would be compressed sufficiently to permit the necessary disengagement of the cam from the left-hand wheel 4. The reverse of this operation of course would be the same, and assuming, for the sake of example, that the cam on the right-hand wheel 4' has been disengaged, Fig. 21, by a previous movement of the bar C to the left the cam is restored to its engaged position by moving the bar C to the right, in which operation the head 23 would first encounter the piston 26, the stiffness of the spring 22 being sufficient to drive the piston and cam coupled thereto back to its original and engaged position. The various steps as they occur to accomplish any given deflection of the axle 2 and the disengagement of the proper cam for the purpose and the restoring of the parts back to their normal position is fully illustrated in the diagrammatic views in Figs. $34^a$, $34^b$, $34^c$, $34^d$, $34^e$, $34^f$, an explanation of which will now be in order. The alinement of the lines $a\ b\ b$ in said figures and the projection of the cams, as shown, indicates that the axle 2 is at right angles to the axis of the vehicle and that the latter is running in a right line, Fig. 34ᵃ, and both cams are engaged. Let us now proceed to disengage the right-hand cam. The first movement of the bar C to the left, Fig. 34ᵇ, causes the notch 31 to pass out of engagement with the pin 30, tripping the levers 28 sufficiently to cause the disengagement of the coupling-blocks 13 in the extension members. In this movement the right-hand piston 26 has come in contact with the end wall of the socket 21 and the left-hand piston has come in contact with the adjacent block 23. A further movement to the left, Fig. 34ᶜ, causes the right-hand piston to be positively actuated and the cam thereof disengaged, while the spring 22 on the left has been compressed to permit the final movement. The disengagement of the right-hand cam, however, results in the release or unclutching of the right-hand wheel, and the axle will naturally deflect to the right, causing the vehicle to turn to the right. Once the axle is deflected it becomes necessary to lock it in position to prevent rattling of the parts. This locking is effected by now moving the bar C in the opposite direction a distance sufficient to effect a reëngagement of the notches 31 with the pins 30, thereby permitting a reëngagement of the coupling-blocks 13 in the extension members, Fig. 34ᵈ. In this movement the right-hand block 23 has come in contact with the right-hand piston 26 (without moving it) and the left-hand piston 26 occupies an approximately central position between the adjacent block 23 and the end of the socket 21. Let us now restore the parts to their original position. A further movement of the bar C to the right, Fig. 34ᵉ, will first drive the right-hand piston 26 and cam thereof back to engaging position, the levers 28 being simultaneously tripped, as shown, to allow for the disengagement of the coupling-blocks 13 in the extension members and permit of the necessary movements of the bar 6 to restore the members to equal lengths on each side of the coupling-pole. The axle 2 is thus again righted and the vehicle running in a straight line; but the extension members are still unlocked. To lock them against rattling and restore their rigidity, the bar C is now again moved to the left, Fig. 34ᶠ, a distance sufficient to effect a reëngagement of the levers 28 with their notches 31, when the blocks 13 will be locked under the action of the springs 17. Likewise the bar C will be restored to its central position along the axle, and both cams will be in engagement, a fact apparent from the realinement of the marks *a b b*. The diagrammatic views just referred to represent the sequences of operations in deflecting the front axle to the right, so that to represent its deflection to the left, as indicated in Fig. 1, the reverse of the diagrams as illustrated would be necessary; but as the two sets of movements are mere counterparts one set of diagrammatic illustrations is herein deemed sufficient. By referring to Fig. 1 it is apparent that the bar C has been shifted to the right to cause the disengagement of the cam on the left and the turning of the wagon to the left; but in the turning of the wagon it becomes necessary not only to unclutch the front wheel, but also the hind wheel on the same side of the wagon. Thus if wheel 4 is unclutched it also becomes necessary to unclutch wheel W on the rear axle A, (the right-hand wheel W' remaining clutched to the rear axle.) This simultaneous disengagement of the cam of the rear wheel with the cam of the front wheel on the same side is accomplished by the following mechanism: The center of the clutch-controlling bar C carries a pin 38, which rides over the inner adjacent edge of a yoke 39, rocking about a pivot 40, depending from the bracket B, the base of said yoke being straight for a portion of its length, whence it is deflected in the shape of forwardly-inclined arms, as seen in the drawings. In the shifting of the bar C in one direction or the other the normal position of the yoke is not affected so long as the extent of the motion of said bar C confines the pin 38 to the straight edge of the yoke, an extent, by the way, sufficient to release the blocks 13 of the extension members. When, however, the bar C is moved a distance sufficient to exert a positive draft on either cam, then by that time the pin 38 begins to travel along the inclined edge of the adjacent arm of the yoke and rock the latter about its pivot, said rocking motion drawing on the link-bar 41, which is adjacent to the pair of wheels to be unclutched, said link-bar in turn tripping the bell-crank lever 42, pivoted to bracket 43 of the bearing 44 of the rear axle, the bell-crank by this movement unclutching the rear wheel W from its axle. How this unclutching or disengagement is effected will be better apparent from details illustrated in Figs. 10 to 14, inclusive.

Like the axle 2 the axle A is provided with a clutch-disk 32', a clutch-fork 37', cam 29', the latter being actuated in one direction jointly by the tilting of the bell-crank 42 in proper direction and by the expansive force of a spring 45, coiled about the stem 46, coupled to the ear 27'' of the cam, and confined within the chamber 47 of the extension 44' of the rear bearing and being actuated in the opposite direction by a tilting of the bell-crank in the opposite direction. In one respect, however, the clutch-fork 37' differs from the fork 37, in that the disposition of the planes of the members or arms of said fork 37' are the reverse of those of fork 37, so that the movement of the cam 29' into the plane of rotation of the inner arm of said fork effects a disengagement of the clutch-disk 32' from the hub H' of the rear wheel, and the movement of the said cam 29' into the plane of rotation of the outer arm of the fork effects an engagement of the clutch-disk with the hub of the rear wheel. In other words, the forks 37 37' are the reverse counterparts of one another, the toggle-link in each case being adjacent to the fork member by which the disengagement is effected and opposite to the member by the tripping of which the engagement is effected. The necessity for this reversal of the fork-arms is obvious, since the cam 29' moves reverse to the cam 29 to produce corresponding results on the same side of the vehicle. As seen in Fig. 14, the bell-crank 42 passes through a terminal eye 48 in the stem 46. By referring to Figs. 1 and 2 it will be seen that the forward ends of the link-bars 41 are provided with elongated slots 49, the object of these being to permit the yoke 39 to exert a draft on one link-bar 41 without for the time being disturbing the opposite link-bar, whereby the cam 29' on one side only shall be actuated. This is obvious from Fig. 2, in which, for example, if the yoke were tilted from left to right in the direction of the hands of a watch the left-hand link-bar 41 would be drawn upon without disturbing the right-hand bar, bringing about the conditions shown in Fig. 1. T T' represent the dust-plates.

A number of details shown in the drawings are not herein specifically referred to, as they are either well known or form a part of my patented device or are such as may be termed "mechanical expedients," for which no special claim is made.

It is of course perfectly obvious that to have brought the parts to the positions indicated in Fig. 1 the handle-bar L must have been swung to the right, whereby the bar C was shifted to the right and the cam of the left wheel 4 disengaged and at the same time the cam of the rear wheel W on the left also disengaged, leaving these wheels loose on their respective axles and the opposite wheels still clutched thereto, enabling the vehicle to make a turn to the left and deflecting the oscillating axle 2 accordingly.

It is of course apparent that I may depart in many details from the present construction without affecting either the nature or spirit of my invention.

Having described my invention, what I claim is—

1. In an automobile driving-gear, a front and rear axle, means for imparting rotation to the same, a coupling-pole connecting the front and rear trucks, and extension members connecting the front axle with the coupling-pole on either side of the latter, thereby permitting deflection of the axle and subsequent locking of the same in its deflected position, substantially as set forth.

2. In an automobile driving-gear, a front and rear axle, means for imparting rotation thereto, wheels loosely mounted on the axles, clutches for connecting the wheels to the axles, a coupling-pole connecting the front and rear trucks, extension members adapted to be locked against movement for a given position of the front axle, and means for unlocking the component parts of the extension members and permitting movement of the same, in advance of the unclutching or disengagement of either wheel from its axle, substantially as set forth.

3. In an automobile driving-gear, a front and rear truck, a coupling-pole for the same, a front horizontally-deflectable axle, extension members connecting the axle to the coupling-pole, said extension members comprising each a toothed extension-bar secured to the coupling-pole, a tube connected to the axle surrounding said bar and having a pocket at a convenient point along the length thereof, a toothed coupling-block in said pocket adapted to engage the toothed bar, an outer movable sleeve surrounding the tube a chamber carried by the sleeve, a wedge in said chamber adapted, upon movement of the sleeve in one direction, to release the block and permit expansion or contraction of the extension member, and to force the block to its locked position upon movement of the sleeve in the opposite direction, substantially as set forth.

4. In an automobile, an extension member comprising an inner toothed extension-bar having one fixed end, a tube fixed at one end surrounding said bar, a collar in said tube, a pocket formed in said collar, an outer movable sleeve inclosing the tube, a chamber formed on the sleeve surrounding the pocket, a toothed coupling-block mounted in said pocket, a wedge in the aforesaid chamber cooperating with the block, a second chamber formed at one end of the sleeve and a spring confined within said second chamber and bearing against a stud formed in the adjacent end of the tube, the parts operating substantially as, and for the purpose set forth.

5. In an automobile driving-gear, an axle, means for rotating the same, a wheel freely rotatable on said axle, a clutch-disk keyed to the axle and confined within the walls of the hub of the wheel, a clutch-fork mounted in the clutch-disk, a toggle-link in hinged connection with said fork, and a cam movable along the axle and adapted to be brought within the plane of rotation of either member of the fork and effect either an engagement of the clutch-disk with, or disengagement from, the hub of the wheel, substantially as set forth.

6. In an automobile driving-gear, a rotatable axle, a wheel loosely mounted in the same, a split clutch-disk coupled to the axle and located within the hub of the wheel, a radial ridge projecting from the hub of the clutch in line with the split end thereof, shoulders formed on each side of the ridge, a clutch-fork having a hinge-arm pivoted on one of the shoulders, a toggle-link pivoted to the opposite shoulder and in hinge connection with the hinge-arm of the fork, the latter having two members encompassing the axle and disposed in different planes, and a cam movable along the axle and adapted to be brought within the plane of rotation of either member of the fork, the parts operating substantially as and for the purpose set forth.

7. In an automobile driving-gear, a front and rear axle, wheels loosely mounted on the same, clutches for coupling the wheels to the axles, a coupling-pole connecting the front and rear axles, extension members connecting the front axle to the coupling-pole, and means under the control of the operator for releasing the component parts of the extension members and subsequently and simultaneously disengaging one pair of wheels on one side of the vehicle from their respective axles, substantially as set forth.

8. In an automobile driving-gear a front and rear axle, a coupling-pole, a clutch-controlling bar movable along the front axle, an extension member on each side of the coupling-pole connecting the latter with the front axle, and intermediate connections between the controlling-bar and extension member for actuating the latter upon movement of the bar in either direction, substantially as set forth.

9. In an automobile driving-gear, a front and rear axle, a wheel at each end of each axle, a clutch for each wheel, a clutch-controlling bar connected to the clutches of the front wheels, and intermediate connections between the bar and rear clutches for actuating the same simultaneously with the actuation of the clutches on the front axle, substantially as set forth.

10. In an automobile driving-gear, a front axle, bearings for the same, a clutch-controlling bar having its ends operating in said bearings, a rear axle, a coupling-pole, extension members between the coupling-pole and front axle, a tripping-lever engaging one of the component parts of each extension member, a notch formed in the clutch-controlling bar and a pin carried by the tripping-lever and adapted to engage the notch, the parts operating substantially as and for the purpose set forth.

11. In an automobile driving-gear, a clutch-controlling bar, sockets at the opposite end thereof, a spring at the base of each socket, a block at the outer end of the spring, a slot formed in the wall of the socket, a pin carried by the block and operating in said slot, a piston in said socket adapted to engage the block a piston-rod on said piston projecting through the end wall of the socket, a cam at the outer projecting end of the piston-rod, and intermediate connections between the cam and hub of the wheel for coupling the wheel to or uncoupling the same from the axle, according to the direction in which the clutch-controlling bar is actuated, substantially as set forth.

12. In an automobile driving-gear, a clutch-controlling bar, a rocking or oscillating yoke adapted to be actuated by the movement of said bar, a rear axle, cams movable along the same and intermediate link connections between the yoke and said cams for actuating the latter upon an oscillation of the yoke in the proper direction, substantially as set forth.

13. In an automobile driving-gear, a clutch-controlling bar, a rocking yoke having a basal straight edge and terminal inclined arms, a pin carried by the clutch-controlling bar and adapted to rise over the straight edge and arms of said yoke, a front and rear axle, cams movable along said axles, the cams of the front axle being actuated directly by the clutch-controlling bar, stems carried by the cams of the rear axle, bell-crank engaging said stems, and link-bars having elongated slots at one end thereof coupled to the free ends of the arms of the yoke, the parts operating substantially as, and for the purpose set forth.

14. In an automobile driving-gear, a clutch mechanism comprising a reciprocating cam, an axle, a wheel having a hub loosely mounted thereon, a split clutch-disk secured to the axle and rotatable therewith and housed within the hub, a clutch-fork and toggle-link suspended from the clutch-disk, a bearing for the axle, an extension for said bearing, a stem in said extension, a spring coiled about said stem, an ear or lug carried by the cam and confined within the extension of the bearing, and means for actuating the stem from the front of the vehicle, substantially as set forth.

15. In an automobile, an axle, a split clutch-disk rotatable about the same, a wheel-hub inclosing said clutch-disk, and toggle-levers controlled from the axle and actuating the clutch-disk, substantially as set forth.

16. In an automobile, an axle, a split clutch-disk rotatable about the same, a wheel-hub inclosing said disk, toggle-levers carried by said disk, and a cam movable along the axle and actuating said toggles, substantially as set forth.

In testimony whereof I affix my signature in presence of two witnesses.

PETER STEINHAUER.

Witnesses:
EMIL STAREK,
G. L. BELFRY.